United States Patent
Cheng et al.

(10) Patent No.: US 8,100,086 B2
(45) Date of Patent: Jan. 24, 2012

(54) **METHOD OF PROMOTING THE REPRODUCTIVE PERFORMANCE OF *PENAEUS* SHRIMPS**

(75) Inventors: Wen-Teng Cheng, Pingtung County (TW); Chun-Hung Liu, Pingtung County (TW); Meng-Yuan Chung, Pingtung County (TW)

(73) Assignee: National Pingtung University of Science & Technology, Pingtung County (TW)

( * ) Notice: Subject to any disclaimer, the term of this patent is extended or adjusted under 35 U.S.C. 154(b) by 0 days.

(21) Appl. No.: 12/813,205

(22) Filed: Jun. 10, 2010

(65) Prior Publication Data
US 2011/0139084 A1 Jun. 16, 2011

(30) Foreign Application Priority Data
Dec. 10, 2009 (TW) .............................. 98142290 A

(51) Int. Cl.
*A01K 61/00* (2006.01)

(52) U.S. Cl. .................................................... 119/205
(58) Field of Classification Search .................. 119/205, 119/204, 210, 212
See application file for complete search history.

(56) References Cited

U.S. PATENT DOCUMENTS

| 4,251,547 A | 2/1981 | Liggett |
| 5,161,481 A | 11/1992 | Laufer |
| 5,698,246 A | 12/1997 | Villamar |
| 5,823,142 A | 10/1998 | Cardinale et al. |
| 6,645,536 B2 * | 11/2003 | D'Abramo ...................... 426/72 |
| 2006/0234905 A1 * | 10/2006 | Estrada Garcia et al. ......... 514/2 |

* cited by examiner

*Primary Examiner* — Yvonne R. Abbott
(74) *Attorney, Agent, or Firm* — Muncy, Geissler, Olds & Lowe, PLLC

(57) ABSTRACT

A method of improving the reproductive performance of *penaeus* shrimps comprises a step of treating a fresh diet with sodium alginate and a step of feeding female *penaeus* shrimps with the treated fresh diet to enhance the breeding ability of female *penaeus* shrimps, also promote growth and survival of the subsequent larvae of the female *penaeus* shrimps.

4 Claims, 1 Drawing Sheet

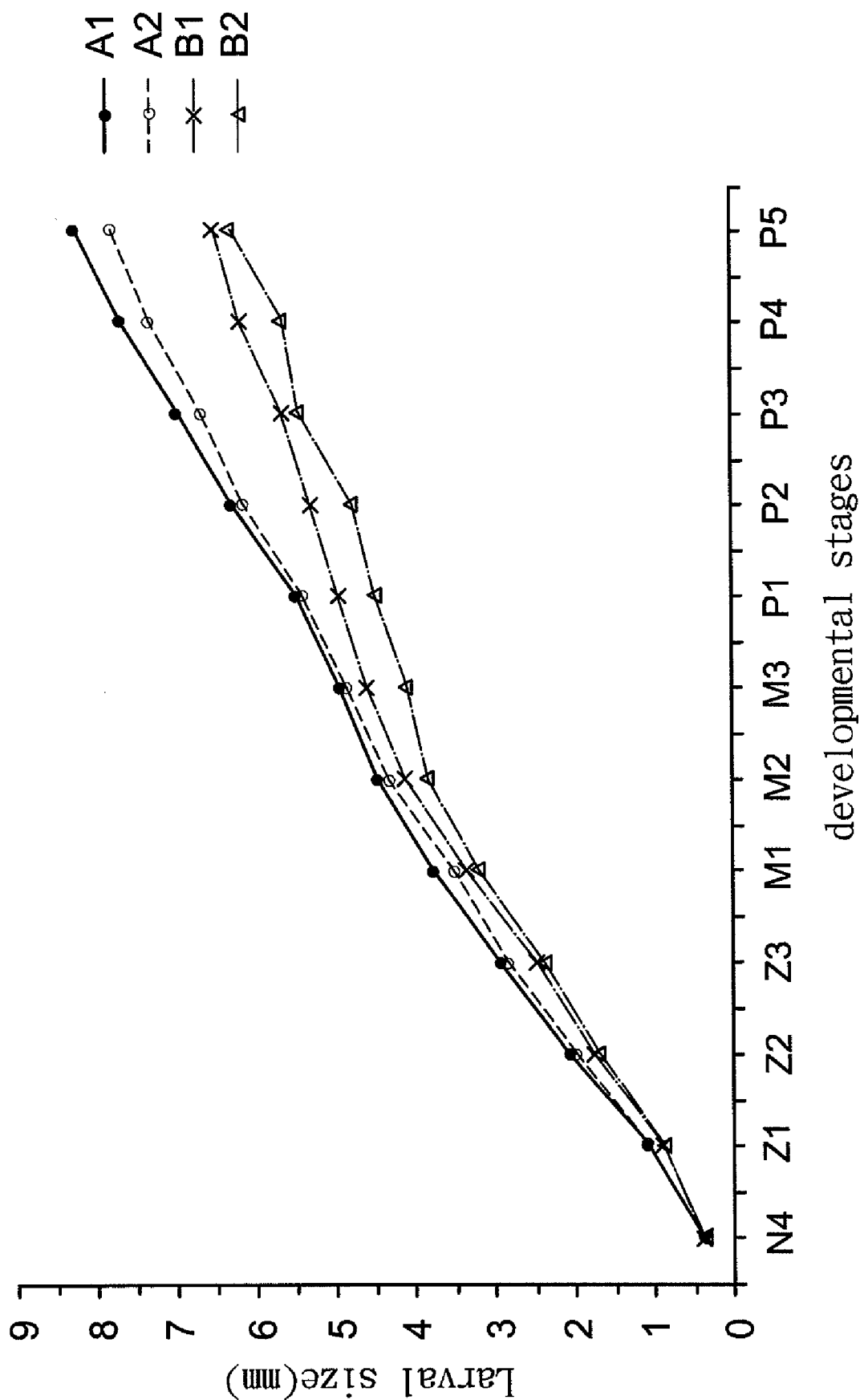

METHOD OF PROMOTING THE REPRODUCTIVE PERFORMANCE OF *PENAEUS* SHRIMPS

BACKGROUND OF THE INVENTION

1. Field of the Invention

The present invention relates to a method of promoting the reproductive performance of *penaeus* shrimps, particularly to a method of promoting the reproductive performance of female *penaeus* shrimps.

2. Description of the Related Art

Since 1970s, due to the fast development of propagation techniques brings about the great achievement of aquaculture in Taiwan, especially in marine shrimps farming. The aquaculture of marine shrimps plays an important role in the fisheries in Taiwan. Currently, the main farming species of shrimp in Taiwan are mainly based on *penaeus* shrimps, which are bigger in size, rapid developing and easy for culturing.

The farming of *penaeus* shrimps in Taiwan have first achieved in 1968, following by a large number of commercial hatchery setting up among everywhere to supply high quantity of shrimps to the industry. However, the farm-raised production of *penaeus* shrimps in Taiwan has been collapsing since 1988, mainly caused by poor management of ecology and viral infection, such as WSSV (white spot syndrome virus), TSV (Taura syndrome virus) and YHV (yellow head virus). Therefore a significant amount of farming shrimps die from diseases, and accordingly the shrimp farming in Taiwan has no longer flourished anymore.

In general, the shrimp aquaculture in Taiwan is highly depended on wild shrimp broodstocks, which are commonly hatched in tanks for growing to maturity, sequentially treated of unilaterally eyestalk-ablation and fed fresh diets. As following, the ovarian development and reproductive performance of hatched wild shrimps will be observed. However, most wild shrimps are pathogen-positive or poor in immunity and physical quality, which may be more susceptible to some pathogen infection. In this situation, it is risky to adopt the wild shrimp broodstocks using for industrial reproduction in aquaculture. On the other hand, for moderating the disease problems of farming shrimps, specific pathogen-free (SPF) broodstocks are selected or widely imported from other countries. However, most SPF shrimps are still susceptible to pathogen infection especially after the unilaterally eyestalk-ablated treatment accompanying with physiological failure or serious death. Hence, whatever using expensive SPF broodstocks or wild catch-broodstocks, they are all ineffectual to avoid pathogen-infection problems in farming industry of shrimps in Taiwan. It seem that it is an urgent need to establish a strategy for aquaculture industry in order to obtain pathogen free shrimp broodstocks successfully.

Recently, for successfully restrict the infection of pathogen on farmed shrimps, some probiotics and immunostimulants are widely developed and applied on aquaculture diets, in order to improve the immunity and disease resistance of farmed-shrimps. The most popular immunostimulants used in aquaculture are polysaccharides which are widely extracted from the cell walls of bacterium, yeast and algae, glucan and alginic acid. In general, immunostimulants used in larvae and growth-out phases of aquatic shrimps have been shown to have good efficacy on pathogen resistance. However, for female broodstocks, unilaterally eyestalk-ablated female broodstocks particularly, it is lack of a sufficient immunostimulant involved in daily diets, for the sake of promoting the innate immunity, as well as the reproductive ability of shrimps. Therefore, it is necessary to establish a useful approach for *penaeus* shrimps not only can improve the health status of broodstock but also can increase the quality and production of larvae.

SUMMARY OF THE INVENTION

The primary objective of this invention is to provide a method of promoting the reproductive performance of *penaeus* shrimps, which can enhance the breeding ability of *penaeus* shrimps, especially for unilaterally eyestalk-ablated female *penaeus* shrimps.

The secondary objective of this invention is to provide a method of promoting the reproductive performance of shrimps in *penaeus* shrimps, which can improve the quality of propagation of unilaterally eyestalk-ablated *penaeus* shrimps.

Another objective of this invention is to provide a method of promoting the reproductive performance of *penaeus* shrimps so that the physiology of subsequent larvae of the female *penaeus* shrimps will be improved.

A method of improving the reproductive performance of *penaeus* shrimps comprises a step of treating a fresh diet with sodium alginate and a step of feeding female *penaeus* shrimps with the treated fresh diet to enhance the breeding ability of female *penaeus* shrimps, also promote growth and survival of the subsequent larvae of the female *penaeus* shrimps.

Further scope of the applicability of the present invention will become apparent from the detailed description given hereinafter. However, it should be understood that the detailed description and specific examples, while indicating preferable embodiments of the invention, are given by way of illustration only, since various will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

SOLE FIGURE is a line chart illustrating the larvae sizes at different development stages after fed with diets with or without sodium alginate.

DETAILED DESCRIPTION OF THE INVENTION

The present invention is about a method of promoting the reproductive performance of *penaeus* shrimps comprising a step of treating a fresh diet with sodium alginate and a step of feeding female *penaeus* shrimps with the treated fresh diet in order to enhance the breeding ability of female *penaeus* shrimps. In the step of treating a fresh diet with sodium alginate, the fresh diets are enriched with sodium alginate via injecting. In the step of feeding female *penaeus* shrimps with the treated fresh diet, a unilaterally eyestalk-ablated female shrimps are prepared and fed with the treated fresh diet in order to improve the generative ability, also the growth and survival of subsequent larvae.

Sodium alginate is a kind of algal polysaccharides, usually extract from the cell walls of seaweeds, such as *Macrocystis pyrifera* and *Laminaria* sp. Generally, the viscosity of algal polysaccharides is different from the source of extraction, as various kinds of seaweed or different extracted parts are involved. It has been reported that sodium alginate is significantly beneficial to the immunity and anti-carcinogenic response in mammalian. Moreover, the sodium alginate is sufficient to promote the innate immunity in fishes and shrimps.

For example, fish diets enriched of sodium alginate were prepared and fed to several virus-free tiger shrimps for the sake of examining the breeding ability of tiger shrimps in the following tests, including a test of reproductive performance and a test of larvae physiology.

In the present invention a sodium alginate enriched-fresh diet was carried out by injecting 20 g $L^{-1}$ of sodium alginate (Kimitsu Algina I-1, Kimitsu Chemical Industries, Chiba, Japan) and stock saline solution into the coelom of live polychaete sea worms in a dose of 200 mg sodium alginate for per kilogram of polychaete sea worm. Meanwhile, saline-injected polychaete sea worms were also prepared in the same way as a control. On the other hand, a sodium alginate enriched-larvae diet was administered as described below, with adding a proximate level of 1.0 g kg-1 of sodium alginate in a basal diet in which contains 40.2% crude protein, 7.2% crude lipids, 14.4% ash, and 8.5% moisture. Also, the same level of cellulose instead of sodium alginate was added in a control larvae diet.

As an example, several females and males of tiger shrimps were prepared (bought from Malaysia) and stocked in epidemic-prevention tanks with aerated seawater (with a salinity of 31‰±1‰) at 29±1° C. setting in an independent quarantine room prior to the viral diagnosis. All seawater was sequentially treated by sand filtration, diatom filtration, charcoal filtration, protein skimming, and UV light irradiation for sterilization. The tiger shrimps free from WSSV-, YHV-, and TSV-infection were selected and transferred into an experimental room for further examination.

The viral free females and males of tiger shrimps were randomly arranged into two groups (Group A and B, each group consisted of five females and three males) and cultured in different indoor cement tanks (around $3\times3\times1.2$ meter$^3$ in size) which contained 6.3 tons of seawater. There was no significant difference of the shrimps between two groups, both with around 158 to 209 gram per broodstock. Shrimps in group A were fed sodium alginate-enriched polychaete sea worms (SA), and shrimps in group (B) were fed saline-receiving polychaete sea worms (NSA, meaning of feeding non sodium alginate-enriched polychaete sea worms). Two groups of tiger shrimps were separately fed alginate-enriched polychaete sea worms and saline-receiving polychaete sea worms for 1 week. During the feeding period, the females shrimps in each group were undergone a unilaterally eyestalk-ablation, and the reproductive performance of each female shrimp was monitored and recorded three days after the unilaterally eyestalk-ablation. After eyestalk ablation, the ovarian development of shrimps may occurred, therefore, the quality, quantity, and hatching rate of eggs production, also the spawning frequency of the shrimps were determined. The feeding process was conducted according to a method published by Cheng et al in 2004, with a feeding rate of around 20%~25% of shrimps' body weight, four times daily at 06:00, 11:00, 17:00, and 22:00. The cement tanks were cleaned twice a day at 07:00 and 15:30 for sweeping away the residual feed and feces.

Referring to Table 1 summarizes the reproductive performance of shrimps in each group, which clearly lists the total egg production per shrimp, per kg body weight and the hatching rate. In the study of reproductive performance, most of the shrimps in group A and B spawned four times during 30 days, but only one shrimps in both groups spawned five times, therefore a total amount of 3925.0±365.8 eggs and 3090±533.9 eggs per shrimp in group A and B individually were obtained. Furthermore, a total amount of egg production per gram of body weight, and total larvae production and egg hatching rate per shrimp in group A (with SA diet) were dramatically higher than those in the group B (with NSA diet). The total egg production per gram of body weight of shrimps in 2 groups were $(22.2\pm1.1)\times10^3$ and $(17.5\pm1.5)\times10^3$ eggs respectively. On the other hand, the total larvae production was $(33.05\pm1.74)\times10^5$ larvae and $(20.175\pm6.22)\times10^5$ larvae, and the egg hatching rates were 80.5±4.3% and 58.8±13.1%, individually.

TABLE 1

Effects of sodium alginate on the breeding ability of tiger shrimps

| Reproductive performance | treatment Groups/diet | |
| --- | --- | --- |
| | (A)/SA | (B)/NSA |
| Total egg production ($\times10^3$) per spawner | 3925.0 ± 365.8 | 3090 ± 533.9 |
| Total egg production ($\times10^3$) per g body weight of spawner | 22.2 ± 1.1 | 17.5 ± 1.5 |
| Total larvae production ($\times10^3$) per spawner | 3305.0 ± 174.0 | 2017.5 ± 622.0 |
| Larvae hatching rate (%) | 80.5 ± 4.3 | 58.8 ± 13.1 |

As a result, the tiger shrimps treated with sodium alginate-enriched polychaete sea worms showed better performance of breeding, with great potential in egg production, larvae production, and the hatching rate of eggs per shrimp. It has been suggested that sodium alginate is inducible to the breeding ability of shrimps, not only promote the eggs production, but also improve the hatching rate and surviving rate of eggs.

For further examination, larvae collected from 2 groups were randomly divided into two subgroups, including larvae from group A (with SA diet) fed the sodium alginate enriched-larvae diet (A1; SA-SA) or control larvae diet (A2; SA-NSA), and larvae from the group B (NSA;) fed the sodium alginate enriched-larvae die (B1; NSA-SA) or control larvae diet (B2; NSA-NSA). In the larvae study, 500-L fiberglass-reinforced plastic (FRP) tanks with 450 L of seawater were set as replicates for each group of treatment. The salinity of seawater was 31‰±1‰, with 30±1° C. of temperature. The daily seawater exchange rate was 20% at the zoea stage, 30% at the mysis stage, and 40% at the postlarvae (PL) stage. Larvae at the zoea, mysis, and PL developmental stages were fed with sodium alginate-enriched larvae diet or control diet for six times daily at 02:00, 06:00, 10:00, 14:00, 18:00, and 22:00. The feeding amount of diets for each tank varied from 0.5~1.5 g meal$^{-1}$ at the zoea stage, 1.5~3 g meal$^{-1}$ at the mysis stage, to 3~5 g meal$^{-1}$ at the PL stage. During the larvae study period, the larvae development, survival rate, and body size were evaluated and recorded. Generally, the larvae developments were determined by larvae size under a dissecting microscope. The survival rate was evaluated at each metamorphic stage using a 500-mL beaker and sampling three times from each tank.

Table 2: The quality and survived rate of larvae at different development stages including naupliar stage (N), zoea stage (Z), mysis stage (M), postlarvae stage (PL)

|  | stage | (A1)/ SA-SA | (A2)/ SA-NSA | (B1)/ NSA-SA | (B2)/ NSA-NSA |
|---|---|---|---|---|---|
| Survival rate (%) of shrimp larvae at different development | N | 100 | 100 | 100 | 100 |
|  | Z1 | 96.3 ± 2.0 | 96.3 ± 2.0 | 95.1 ± 3.7 | 95.1 ± 1.4 |
|  | Z2 | 95.6 ± 0 | 91.1 ± 2.2 | 92.7 ± 0 | 84.6 ± 4.9 |
|  | Z3 | 94.8 ± 1.5 | 92.6 ± 2.0 | 87.8 ± 1.4 | 76.4 ± 7.2 |
|  | M1 | 89.6 ± 2.0 | 88.1 ± 2.0 | 78.9 ± 0.8 | 63.4 ± 3.7 |
|  | M2 | 87.4 ± 3.0 | 84.4 ± 2.6 | 73.2 ± 4.9 | 52.8 ± 3.5 |
|  | M3 | 86.7 ± 2.2 | 80.7 ± 2.7 | 67.5 ± 4.9 | 40.7 ± 2.9 |
|  | PL1 | 85.2 ± 3.0 | 77.0 ± 5.2 | 45.5 ± 4.1 | 27.6 ± 3.5 |
|  | PL2 | 80.7 ± 3.0 | 73.3 ± 5.6 | 34.1 ± 5.1 | 17.1 ± 4.9 |
|  | PL3 | 80.8 ± 3.4 | 71.1 ± 6.4 | 24.4 ± 2.4 | 10.6 ± 4.5 |
|  | PL4 | 79.3 ± 1.5 | 66.7 ± 6.8 | 16.3 ± 2.2 | 4.9 ± 2.4 |
|  | PL5 | 77.0 ± 2.0 | 65.9 ± 5.2 | 8.9 ± 0.8 | 2.4 ± 1.4 |

Referring to Table 2, reveals the survival rate (%) of shrimp larvae at different development stages after the treatment of sodium alginate-enriched larvae diet or control larvae diet. There was no significant difference found in larvae metamorphosis between larvae from two groups (A and B), which were all hatched around 13 hours after spawning, took around 48 hours to develop through six nauplier stages (N) into the zoea 1 stage (Z1), then took around 113 hours to metamorphose from Z1 to the mysis 1 stage (M1) and finally took around 98 hours to develop into the postlarvae 1 stage (PL1). According to the data shown in Table 2, larvae from group A had significantly higher survival rate than that of B, especially after M1 stage. Moreover, survival rates of larvae both from group A or B were significantly higher after being treated with sodium alginate-enriched larvae diet compared to larvae fed control larvae diet, especially from the stage of M1 to P4. At the end of the larvae study, the respective survival rates in the group A1, A2, B1 and B2 were approximate at 77.0±2.0%, 65.9±5.2%, 8.9±0.8%, and 2.4±1.4% individually.

Referring to the sole figure, shows that larvae from group A have significantly larger body size than that of larvae from group B as the first feeding stage (Z1) to the end (PL5). The larvae size at Z1 of group A was much larger than that of group B by 0.2 micrometer. Additionally larvae whatever collected from group A or B fed sodium alginate-enriched larvae diet had significantly larger body size than that of larvae fed the control diet, especially after the development of M2 stage. At the end of the larvae study, the body sizes of the A1, A2, B1 and B2 in the PL5 stage were 8.30±0.06, 7.80±0.06, 6.53±0.19, and 6.33±0.09 micrometer, respectively. It seems that positive stimulated effects of sodium alginate are observed on larvae development with dramatically enlargement of body size and longer surviving time of larvae.

Consequently, the sodium alginate treated polychaete sea worms in the present invention are sufficient to advance the reproduction of *penaeus* shrimps, which results in higher fecundity and larvae production compare to brookstock with non-sodium alginate enriched-diet. It is believed that the ovary development and egg quality of *penaeus* shrimps are all improved by treating of sodium alginate. Furthermore, the larvae spawns by females that fed sodium alginate-enriched polychaete sea worms also show great performance in survival rate and body size compared to larvae spawns by females without sodium alginate enrichment. It is suggested that treating with sodium alginate treated fresh diet not only can promote the reproductive physiology and hatching rate of *penaeus* shrimps, but also can improve the physiological quality of larvae, including survival rate and body size. Therefore, it will be feasible and economical to develop sodium alginate treated fresh diets in Taiwan, especially for treating with female *penaeus* shrimps, for further improving the quality of aquaculture in Taiwan.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A method of improving the reproductive performance of *penaeus* shrimps, comprising:
    treating a fresh diet with sodium alginate, wherein the fresh diet is polychaete sea worm; and
    feeding female *penaeus* shrimps with the treated fresh diet to enhance the breeding ability of female *penaeus* shrimps, also promote growth and survival of the subsequent larvae of the female *penaeus* shrimps.

2. The method of improving the reproductive performance of *penaeus* shrimps as defined in claim 1, wherein the female *penaeus* shrimps are unilaterally eyestalk-ablated before fed with the treated fresh diet.

3. The method of improving the reproductive performance of *penaeus* shrimps as defined in claim 1, wherein treating a fresh diet with sodium alginate is performed by injecting the sodium alginate into the fresh diet.

4. The method of improving the reproductive performance of *penaeus* shrimps as defined in claim 3, wherein the dosage of injecting is 200 mg/per kg of the fresh diet.

* * * * *